(12) United States Patent
Shi et al.

(10) Patent No.: US 6,704,103 B2
(45) Date of Patent: Mar. 9, 2004

(54) COATINGS FOR SENSITIVITY ENHANCEMENT OF SIGNAL FROM GLASS DISKS

(75) Inventors: Rui-Fang Shi, Carlsbad, CA (US); Carlos A. Duran, San Diego, CA (US)

(73) Assignee: KLA-Tencor Corporation, San Jose, CA (US)

( * ) Notice: Subject to any disclaimer, the term of this patent is extended or adjusted under 35 U.S.C. 154(b) by 28 days.

(21) Appl. No.: 09/939,466

(22) Filed: Aug. 23, 2001

(65) Prior Publication Data

US 2003/0043371 A1 Mar. 6, 2003

(51) Int. Cl.[7] .................................................. G01J 1/10
(52) U.S. Cl. ...................................................... 356/243.3
(58) Field of Search ........................... 356/243.1, 243.3, 356/630, 632

(56) References Cited

U.S. PATENT DOCUMENTS

| | | | |
|---|---|---|---|
| 5,473,431 A | | 12/1995 | Hollars et al. |
| 5,490,131 A | | 2/1996 | Ohta et al. |
| 5,539,213 A | | 7/1996 | Meeks et al. |
| 5,582,878 A | | 12/1996 | Ogawa et al. |
| 5,650,889 A | | 7/1997 | Yamamoto et al. |
| 5,674,638 A | * | 10/1997 | Grill et al. ............ 428/694 TC |
| 5,706,080 A | * | 1/1998 | Pekin et al. .................. 356/72 |
| 5,766,727 A | | 6/1998 | Moroishi et al. |
| 6,317,210 B1 | * | 11/2001 | Wen et al. .................. 356/620 |
| 6,404,504 B2 | * | 6/2002 | Liu et al. .................... 356/507 |

OTHER PUBLICATIONS

Pavlat, Russell, "Flying Height Measurement Systems and Slider Absorption," IDEMA—Sep./Oct. 1994, vol. VII, No. 5.

Lee, et al. "Enhanced Tribological Performance of Rigid Disk by Using Chemically Bonded Lubricant," J. Vac. Sci. Technology, vol. 11, No. 3, May/Jun. 1993.

Macheha, et al. "The Tribology of Tripad Sliders with Hydrogenated and Nitrogenated Disks," IEEE 1996, 1 page.

Smallen, et al. "The Role of Disk Carbon and Slider in Water Adsorption," IEEE 1994.

Merchant, et al. "Lubricant Bonding and Orientation on Carbon Coated Media," IEEE Transactions on Magnetics, vol. 26, No. 5, Sep. 1990.

Amir, et al. "Properties of Nitrogen–doped Amorphous Hydrogenated Carbon Films," American Institute of Physics, Nov. 1991.

Freire, et al. "Nitrogen Implantation into Amorphous Carbon Films," NIMB—Nuclear Instruments and Methods in Physics Research 1995.

Demichelis, et al. "Deposition and Characterization of Amorphous Carbon Nitride Thin Films," Diamond and Related Materials 1995.

Hauert, et al. "Influence of Nitrogen Doping on Different Properties of a–C:H," Thin Solid Films 268, 1995.

Dworschak, et al. "Microstructures and Mechanical Properties of Amorphous Hydrogenated Carbon–Nitrogen Films," Diamond and Related Materials, 1994.

(List continued on next page.)

Primary Examiner—Michael P. Stafira
(74) Attorney, Agent, or Firm—Irell & Manella LLP

(57) ABSTRACT

The present invention is a method for providing a disk of an optical tester. The disk comprises a transparent substrate that has a first surface and an opposite second surface. The disk also includes a coating on the first surface of the transparent substrate. An identical coating can be applied to the second surface of the transparent substrate. The coating can have multiple layers of thin films. The present invention provides a method to determine the required thickness of the coating to enhance the sensitivity of zero flying height measurement.

15 Claims, 7 Drawing Sheets

OTHER PUBLICATIONS

Ruhe, et al. "Terminal Attachment of Perfluorinated Polymers to Solid Surfaces," IBM Research Division 1994.

Murayama, et al. "Lubricant Bonding Via Terminal Bond Network," IEEE Transactions on Magnetics, vol. 31, No. 6, Nov. 1995.

Lee, et al. "The Effect of Chemical and Surface Properties of Hydrogenated Carbon Overcoats on the Tribological Performance of Rigid Magnetic Disks," IEEE Transactions on magnetics, vol. 29, No. 1, Jan. 1993.

Kokaku, et al. "Properties of Diamond–like Carbon Film and Its Application as a Protective Layer in Thin–Film Magnetic Recording Disks," IEEE Transactions on Magnetics, vol. 29, No. 6, Nov. 1993.

Tsai, et al. "Critical Review: Characterization of Diamond like Carbon Films and their application as Overcoats on Thin–Film Media for Magnetic Recording," American Vacuum Society, Nov./Dec. 1987.

Kaufman, et al. "Symmetry Breaking in Nitrogen–doped Amorphous Carbon: Infrared Observation of the Raman–active G and D bands," Physical Review B: Condensed Matter, Third Series, vol. 39, No. 18, Jun. 1989.

Revelle, et al. "The Role of Hydrogen in the Growth of Amorphous Hydrogenated Carbon," Solid State Communications, vol. 86, No. 4, pp. 235–237, 1993.

* cited by examiner $n_{coating} > n_{glass}$
$n_{coating} t_1 = \lambda/4$ $h_{min} < 0$ $n_{coating} < n_{glass}$
$t_1$ close to zero $h_{min} < 0$

COATINGS FOR SENSITIVITY ENHANCEMENT OF SIGNAL FROM GLASS DISKS

BACKGROUND OF THE INVENTION

1. Field of the Invention

The present invention relates to a coated transparent substrate that is used in a flying height tester that measures the height of an air bearing between a disk and a recording head of a hard disk drive.

2. Description of the Background

Hard disk drives contain a number of magnetic recording heads which magnetize and sense a rotating magnetic disk. The recording heads are integrated into a slider which has aerodynamic features that create an air bearing between the head and the rotating disk. The air bearing prevents contact and corresponding mechanical wear of the recording head. A slider is further assembled to a flexure arm to create a head gimbal assembly (HGA).

The sliders are typically tested in a flying height tester before being installed into a hard disk drive assembly. Flying height testers measure the height of the air bearing to insure that the slider complies with manufacturing specifications. Flying height testers typically contain a loader which places each slider adjacent to a rotating transparent disk. A beam of light is directed through the glass disk and reflected off of the slider surface. Multiple reflections occur at the glass/air and slider/air interfaces, creating an interference pattern that is detected and analyzed by the tester to determine the flying height of the slider. The current industry standard is the Dynamic Flying Height Tester (DFHT) made by Phase Metrics, Inc. which is now part of KLA-Tencor, Inc. the assignee of the present application. The DFHT utilizes multiple wavelength intensity based interferometry to determine the flying height.

The measurement sensitivity of DFHT depends on the slider flying height which is increasingly becoming lower and lower to increase the coupling between the magnetic head and disk. Theoretically, the DFHT has zero sensitivity at zero flying height if the slider air bearing surface material possesses no imaginary part (k) for the refractive index. Materials possessing vanishing k in the visible region include BK7 glass and $Al_2O_3$. Fortunately, typical air bearing surface materials are AlTiC, a granular material made of $Al_2O_3$ and TiC. The k value of AlTiC is such that the zero sensitivity flying height is shifted to about negative 10 nm, making low positive flying height measurement possible for DFHT.

Sliders are increasingly designed to operate in or near contact with the disk. The contact may create undesirable wear on the slider or disk during the flying height test. As the flying height gets lower and lower, there is an increasing concern about the tribology of the slider-disk interface such as the disk-surface smoothness. One possible solution is to apply a thin layer of diamond-like carbon (DLC) coating onto the disk. This, however, has the disadvantage of shifting the intensity minimum from a negative flying height to a positive flying height (due to the refractive index of the slider surface). As a result, the measurement sensitivity of the flying height tester is much reduced at low flying height. In addition, sometimes it is desirable to measure the flying height on the $Al_2O_3$ cap where the magnetic transducers are located. The current DFHT does not have the sensitivity to measure on $Al_2O_3$ at very low flying height. Furthermore, magnetic head manufacturers are changing the air bearing surface materials, some of which have very low k values making measurement at near contact flying height impossible.

There have been several attempts trying to replace DFHT, which is an intensity based interferometer. There was marketed a flying height tester by Zygo Corp. The technology is explained in U.S. Pat. No. 5,557,399 issued to DeGroot. The Zygo machine utilized a polarized coherent light beam that is reflected from the disk and slider at an oblique angle. In theory, the technology should have high sensitivity at zero flying height. But in practice, it faced many fundamental limitations. The most difficult one is the birefringence in the fast-rotating glass disk due to the centrifugal force in the disk. The birefringence rotates the polarization of the returning light beam and makes accurate flying height measurement extremely difficult. In addition, the birefringence effect is more pronounced at an oblique angle away from normal incidence, and is proportional to the square of the angular velocity of the spinning glass disk.

There has also been developed a flying height tester by the assignee the present application, formerly Phase Metrics and currently KLA-Tencor, which is disclosed in U.S. Pat. No. 6,184,992 in the name of Duran et al. In the Duran patent a birefringence element such as a Savart plate is used to split the light reflected from the slider/disk interface into an ordinary beam and an extraordinary beam, thereby creating a double image of the slider/disk interface. The technology is based on phase shifting interferometry and in principle has very good sensitivity at zero flying height. However, in practice, this technology is not robust on the AlTiC grainy surface and suffers from instrument vibration as well as glass birefringence even in the normal incidence case.

For those skilled in the art, it is easy to understand that for an intensity based interferometer such as DFHT, coating on the glass disk with materials having refractive index smaller than that of the BK7 glass will shift the intensity minimum position more negative. $MgF_2$ is an example of such materials. However, these materials do not satisfy the stringent tribological requirements for flying a slider. Coating materials satisfying the stringent tribological requirements usually have refractive index higher than that of BK7 glass. A thin layer of these coating materials will shift the intensity minimum position in the positive direction, therefore reducing the measurement sensitivity at very low flying height.

Over the years, the DFHT technology has been greatly improved. Examples include 0.01 micro inch gauge capability, automatic image based edge detection, and intelligent calibration algorithms. It would therefore be desirable to provide a transparent disk technology so that the mature DFHT technology can be extended to measuring zero flying height accurately on any slider air bearing surface.

BRIEF SUMMARY OF THE INVENTION

The present invention is a method for providing a disk of an optical tester. The disk comprises a transparent substrate that has a first surface and an opposite second surface. The disk also includes a coating on the first surface of the transparent substrate. An identical coating can be applied to the second surface of the transparent substrate. The coating can have multiple layers of thin films. The coating material can have higher refractive index than BK7 glass. The present invention provides a method to determine the required thickness of the coating to enhance the sensitivity of zero flying height measurement.

DETAILED DESCRIPTION OF THE INVENTION

Coatings on glass disks offer a way to improve the tribological properties of the glass surface as well as the interferometer signal produced by the gap between the glass and a second reflective surface of interest. Specific applications of interest include measuring the flying height of a disk drive slider on a rapidly spinning glass disk and the measurement of pole-tip recession using a slider positioned at a small gap distance between a glass reference flat.

A coating or layer is deposited on a glass disk. In one embodiment, the minimum thickness t of such a coating is $\lambda/4n_c$ where $\lambda$ is the light wavelength, and $n_c$ is the refractive index for the coating material. Such a deposition may be performed through the use of an e-beam process, sputtering and chemical vapor deposition techniques or other processes for applying coatings. In one embodiment, the coating is a diamond-like-carbon (DLC) material. Alternatively, the coating may be a hydrogenated or nitrogenated DLC material or any combination thereof. Since $\lambda$, the wavelength of the light and $n_c$, the refractive index for the coating material is known, the minimum thickness t of the coating may be ascertained. In addition, since the property $n_c$ of the coating is known, the optimal thickness top may be determined experimentally as discussed in detail in the following sections.

Theory of Operation

Figure 1:
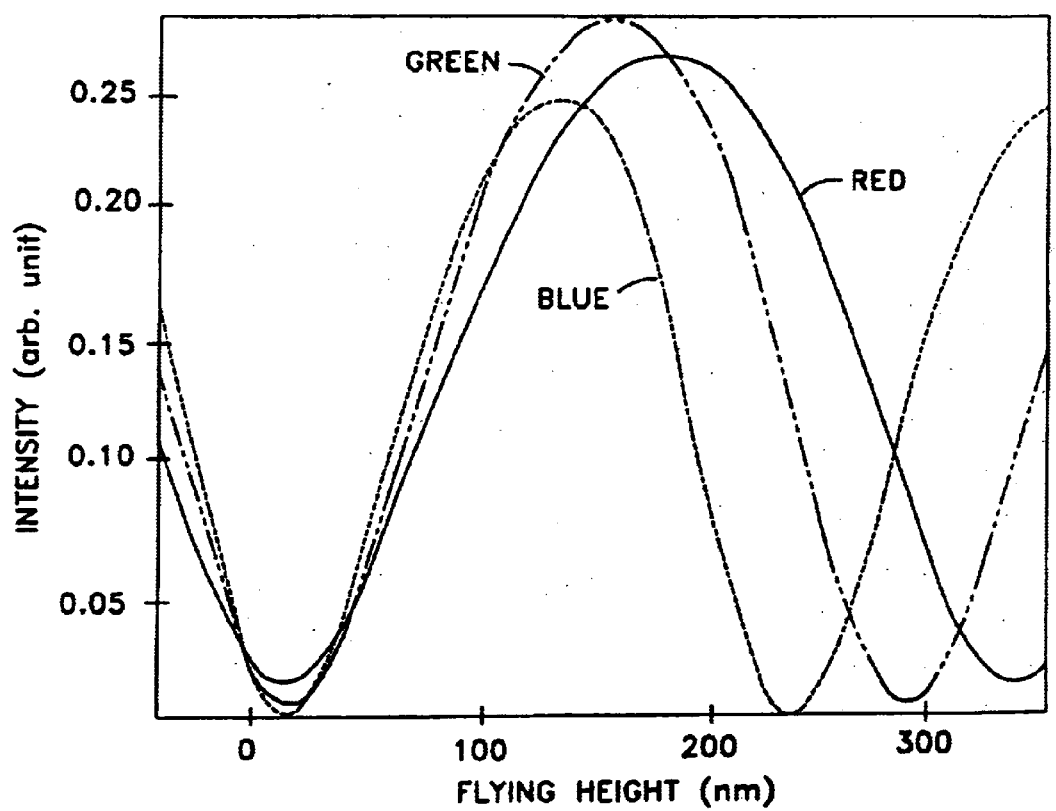
FIG. 1 illustrates one example of the intensity curves at different flying heights for the three wavelengths used in a flying height tester assuming a diamond-like carbon coating thickness of 5 nm.

FIG. 1 illustrates one example of the intensity curves at different flying heights for the three wavelengths used in a flying height tester assuming a diamond-like carbon coating on the glass disk with the thickness of 5 nm. One example of such a flying height tester is the DFHT as marketed by Phase Metrics, Inc (now part of KLA-Tencor, Inc). The flying height at which the intensity reaches minimum is found to be 15 nm, 17 nm, and 15 nm, respectively, for the three colors, green, red and blue respectively. This indicates that accurate flying height measurement around 15 nm would be impossible.

In the present invention, the coating thickness is increased to above a threshold such that the intensity minimum is shifted towards a negative flying height value. It has been found that the coating thickness threshold is determined by $t_1=\lambda/(4n_c)$ in the absence of the absorptive part (k) of the refractive index, where $\lambda$ is the light wavelength and $n_c$ is the refractive index for the coating material.

Figure 2:
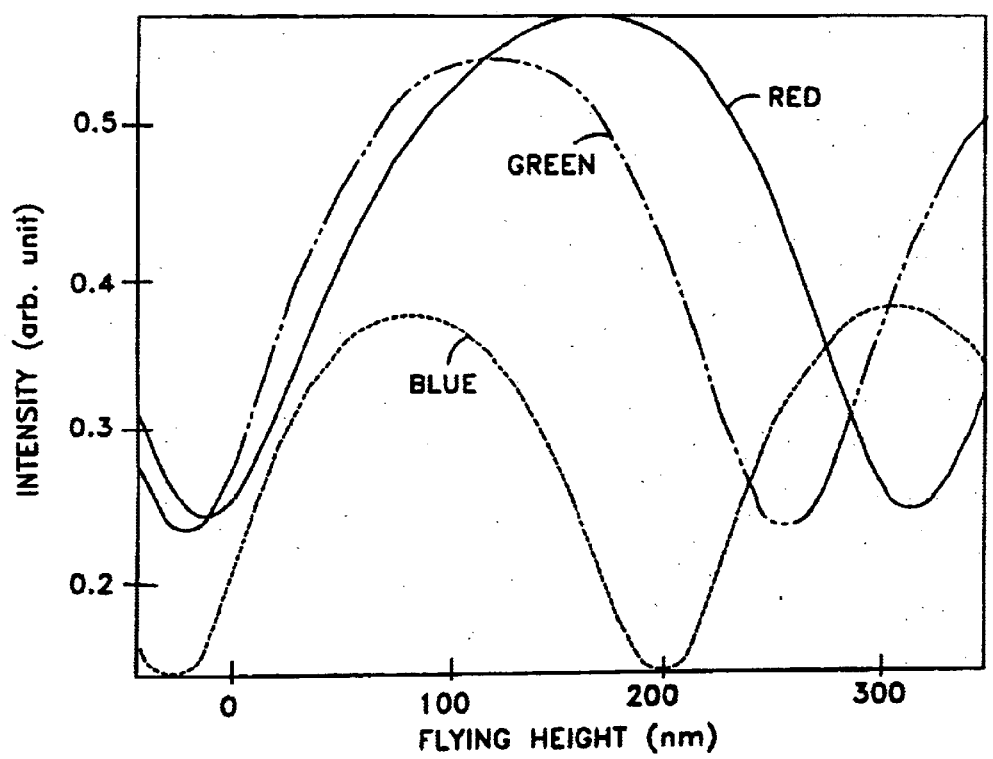
FIG. 2 illustrates one example of the intensity curves at different flying heights assuming a diamond-like carbon coating thickness of 50 nm.

FIG. 2 illustrates one example of the intensity curves at different flying heights assuming a diamond-like carbon coating thickness of 50 nm. The flying height at which the intensity reaches minimum is found to be −26 nm, −20 nm, and −11 nm, for the three colors, blue, green and red respectively. This shift in the negative flying height direction for the intensity minimum will result in significant sensitivity increase at the low flying height.

Figure 3:
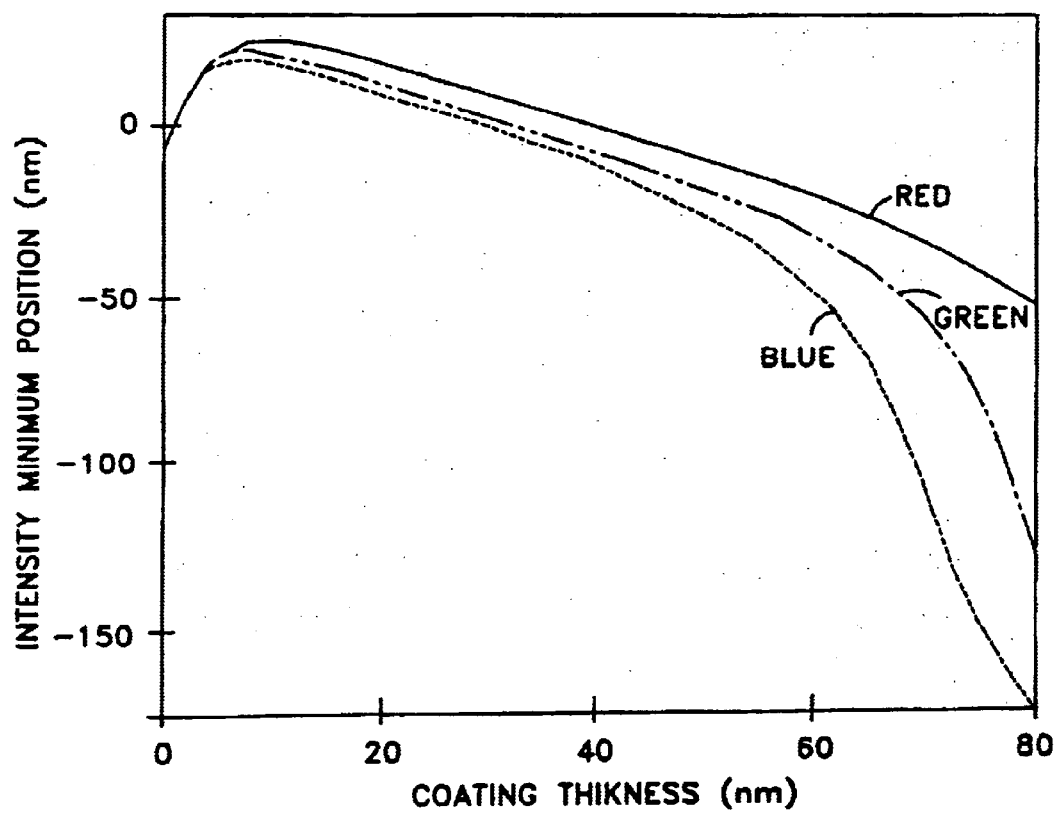
FIG. 3 illustrates one example of the intensity minimum position versus coating thickness at three wavelengths.

FIG. 3 illustrates one example of the intensity minimum position versus coating thickness at three wavelengths. At zero coating thickness, the negative value of the intensity minimum position is due to the non-vanishing slider k. As one increases the coating thickness, the minimum position increases rapidly to positive values first, and then decreases gradually to negative values. The actual behavior of the curves depends on the refractive indices of the coating. A schematic explanation is detailed in FIGS. 4A and 4B and FIGS. 5A and 5B.

An added advantage of the technique of the invention is the reduced slope of the curves as shown in FIG. 3 near the threshold thickness $\lambda/(4n_c)$, as compared with the slope at near zero thickness. This indicates that errors in flying height determination stemming from errors in coating thickness will be reduced in proportion with the reduction in slope.

Figure 4A:
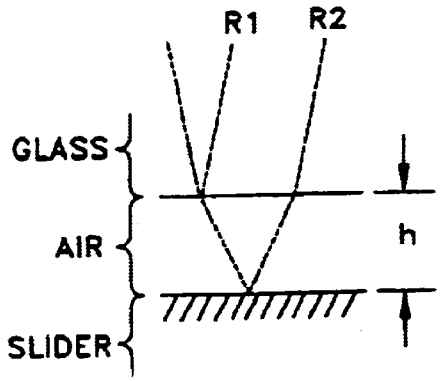
FIGS. 4A and 4B illustrate one example of two electric field vectors R1 and R2 in the absence of any coating, where R1 is the reflection off the glass-air interface and R2 is the transmission through the air-glass interface for the light reflected off the slider surface.
Figure 4B:
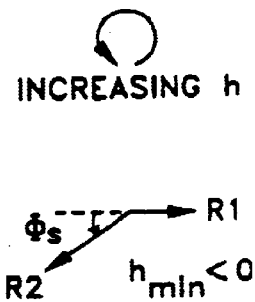

FIGS. 4A and 4B illustrate one example of two electric field vectors R1 and R2 in the absence of any coating, where R1 is the reflection off the glass-air interface and R2 is the transmission through the air-glass interface for the light reflected off the slider surface. The phase angle between R1 and R2 is determined by $\Pi-\phi_s$, where $$\phi_s = \arctan\frac{2k_s}{n_s^2 + k_s^2 - 1},$$

and $(n_s,k_s)$ is the refractive index of the slider surface material. As the air gap distance h (flying height) increases, R2 rotates counter-clockwise while R1 remains fixed. The flying height at which the light intensity reaches a minimum is $$h_{\min} = -\frac{\lambda}{4\pi}\phi_s$$

which for a typical slider material is around −10 nm.

Accordingly, in order for R2 to cancel out R1, R2 has to rotate clockwise (negative flying height). The negative value facilitates the ability to measure low flying height accurately. In one embodiment, the slider material must have significant optical absorption. If the slider material has no optical loss, the light intensity will reach a minimum at zero flying height, resulting in zero measurement sensitivity at zero flying height.

Figure 5A:
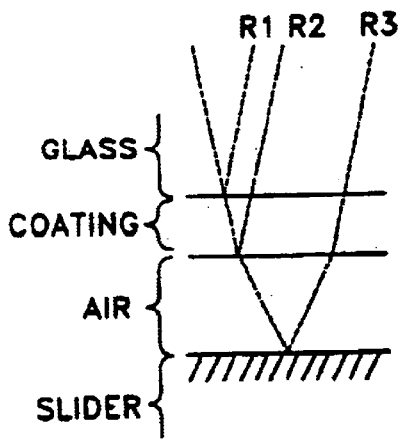
FIGS. 5A and 5B illustrate one embodiment of the electric field vectors when there is a thin coating on glass when the coating refractive index is greater than that of glass.
Figure 5B:
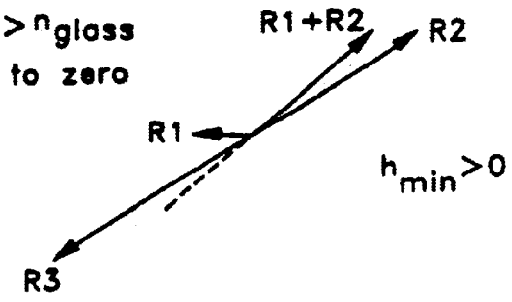

FIGS. 5A and 5B illustrate one embodiment of the electric field vectors when there is a thin coating on glass when the coating refractive index is greater than that of glass. When the coating thickness is fixed, R1 and R2 remain constants while R3 rotates counter-clockwise as the flying height increases. In order for R3 to cancel out R1+R2, it has to rotate counter-clockwise. This indicates that when the intensity reaches the minimum, the corresponding flying height has a small positive value. The measurement sensitivity at zero or low flying height is then at a minimum.

Figure 6:
FIG. 6 illustrates one embodiment of the electric field vectors when the coating thickness is $\lambda/(4n_c)$.

FIG. 6 illustrates one embodiment of the electric field vectors when the coating thickness is $\lambda/(4n_c)$. R2 and R1 are now aligned in the same direction. In order for R3 to cancel R1+R2, R3 has to rotate clockwise, indicating that flying height at which the intensity is a minimum, is negative.

Figure 7:
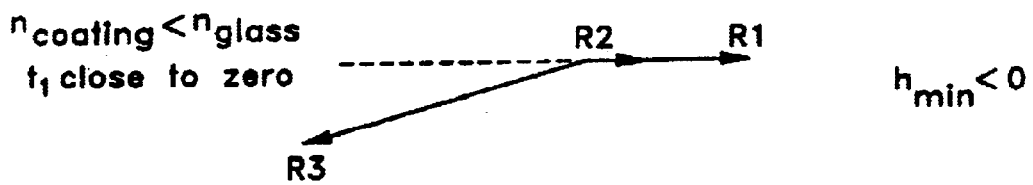
FIG. 7 illustrates one embodiment of the electric field vectors when the coating refractive index is less than that of glass.

FIG. 7 illustrates one embodiment of the electric field vectors when the coating refractive index is less than that of glass. It can be observed that the flying height at which the intensity is a minimum is negative if the coating is thin. However, such coating materials are difficult to find and they are usually not able to meet the stringent tribology requirements of the glass slider interface.

The equations used to calculate the flying height from the measured intensity must be modified in the presence of coating materials on glass disk. It is well known that in the absence of coating and ignoring light scattering and depolarization effects on the slider air bearing surface, the measured light intensity is $$I = I_p + I_0 r^2 + s^2 - \frac{2rs\cos\left(\frac{4\pi h}{\lambda} + \phi_s\right)}{1 + r^2 s^2 - 2rs\cos\left(\frac{4\pi h}{\lambda} + \phi_s\right)}, \quad (1)$$

where $I_p$ is the light intensity reflected off the top surface of the glass disk, $I_0$ is the intensity propagating inside the glass disk, r is the amplitude reflectivity of the glass disk $$r = \frac{n_g - 1}{n_g + 1}$$

with $n_g$ being the glass refractive index, s is the amplitude of the slider surface, and $$\phi = \arctan\frac{2k_s}{n_s^2 + k_s^2 - 1}.$$

We can show that when the coating is present, the above equation must be modified to $$I = I_p + I_0|a|^2 + |b|^2 r_s^2 - \frac{2|ab|r_s\cos\left(\frac{4\pi h}{\lambda} + \phi_s + \delta_0\right)}{|c|^2 + |d|^2 r_s^2 - 2|cd|r_s\cos\left(\frac{4\pi h}{\lambda} + \phi_s + \delta_0\right)}, \quad (2)$$

where $$a = -\frac{r_c - r - e^{2i\delta_c}r_c(1 - r_c r)}{1 - r_c^2},$$

$$b = -\frac{r_c(r_c - r) - e^{2i\delta_c}(1 - r_c r)}{1 - r_c^2},$$

$$c = \frac{1 - r_c r - e^{2i\delta_c}r_c(r_c - r)}{1 - r_c^2},$$

$$d = \frac{r_c(1 - r_c r) - e^{2i\delta_c}(r_c - r)}{1 - r_c^2},$$

and $r_c$ is the coating-air reflectivity $$r_c = \frac{n_c - 1}{n_c + 1},$$

$\delta_c$ is the phase shift inside the coating $$\delta_c = \frac{2\pi n_c t_c}{\lambda}$$

with $n_c$ being the refractive index for the coating and $t_c$ the coating thickness. $\delta_0$ is the additional phase shift due to the coating layer $$\delta_0 = \arg\frac{e^{2i\delta_c} - r_c r_{gc}}{e^{2i\delta_c}r_c - r_{gc}}.$$

In the above equation, $r_{gc}$ is the coating-glass reflectivity $$r_{gc} = \frac{n_c - n_g}{n_c + n_g}.$$

If the coating material is slightly absorptive, $n_c$ is then complex. Equation (2) shows that the phase shift due to the coating is de-coupled from the phase shift due to the slider ($n_s, k_s$). This means that once the overall phase shift is measured for one slider material, the overall phase shift for other slider materials can be directly deduced.

Figure 8:
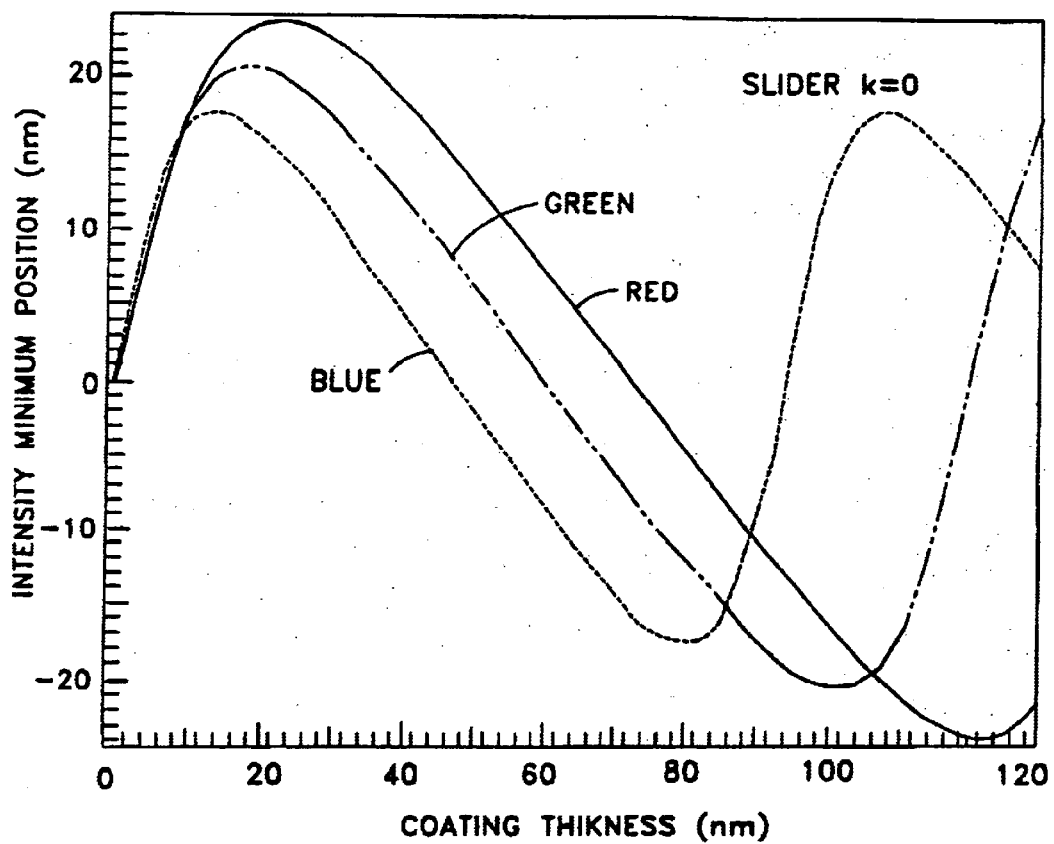
FIG. 8 illustrates one example of the flying height at which the intensity is a minimum as a function of coating thickness for titanium dioxide assuming the slider is non-absorptive ($k_s=0$).

There are other candidates for coating materials that may satisfy the phase shift requirement. Examples include titanium dioxide and silicon nitride. For example, FIG. 8 illustrates one example of the flying height at which the intensity is a minimum as a function of coating thickness for titanium dioxide assuming the slider is non-absorptive ($k_s$= 0). From the figure, it seems that an optimum coating thickness can be achieved at 80 nm, corresponding to the blue minimum. This is due to the consideration that in order to measure the flying height accurately in the presence of coating, the coating thickness must be uniform. A minimum position for the curve corresponding to the blue color (wavelength $\lambda$=450 nm) in FIG. 8 indicates that the effect of coating thickness variation on flying height is minimized. Additional under layer for adhesion purpose and over layer for tribology purpose may be added.

Implementation

Figure 9:
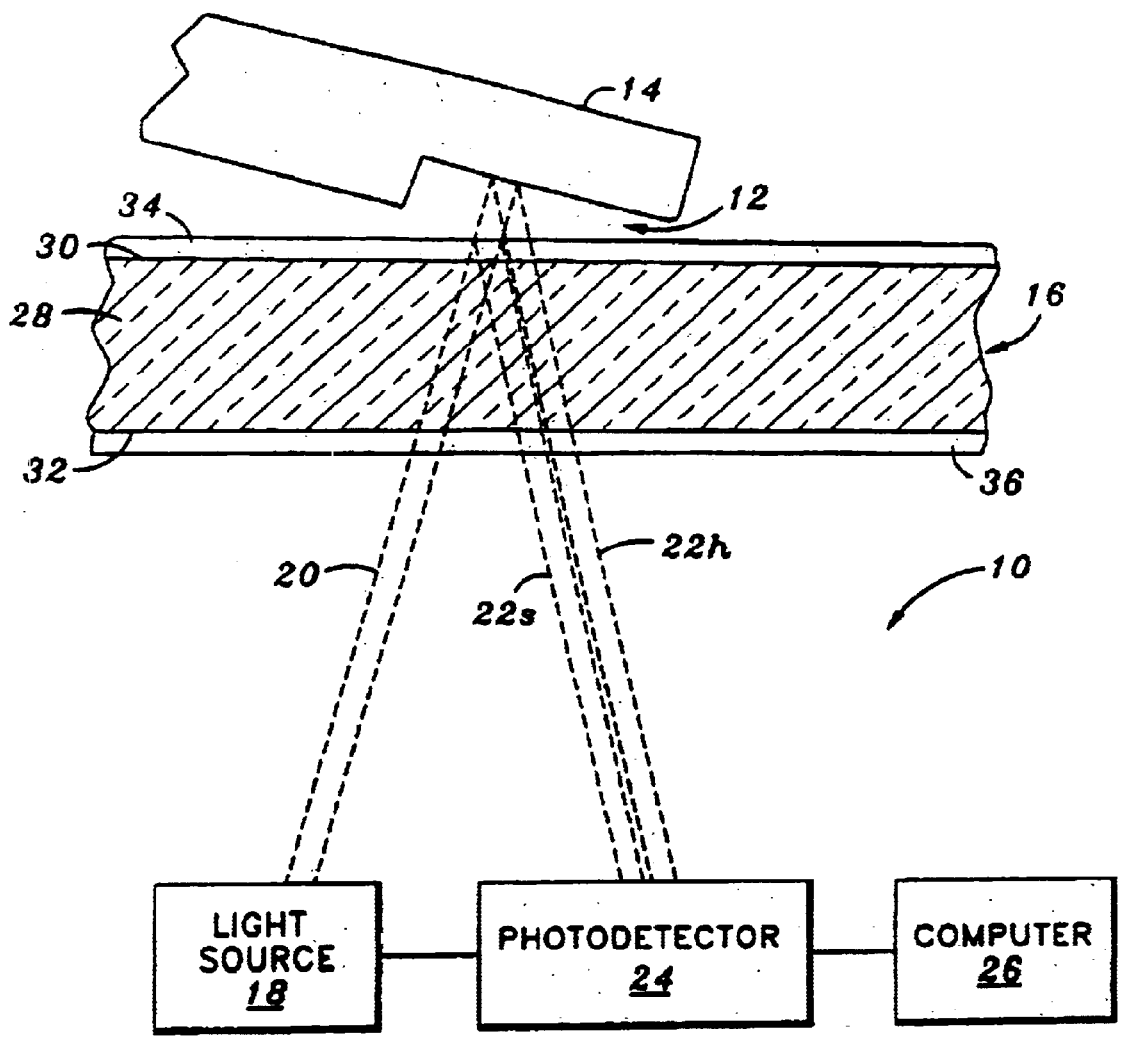
FIG. 9 illustrates one embodiment of a flying height tester.

FIG. 9 illustrates one embodiment of a flying height tester 10. The flying height tester 10 is typically used to measure the height of an air bearing 12 created between a slider 14 of a recording head and a rotating transparent disk 16. The slider 14 is typically mounted to a loader (not shown) which can allow an operator to place a new head thereon. The flying height tester 10 can therefore test a number of different sliders 14. Although a flying height tester 10 is shown and described, it is to be understood that the disk 16 of the present invention can be configured in other shapes and used in other optical testers such as an optical profilometer that utilizes an optical reference surface.

Used in the flying height tester 10, the transparent disk 16 is rotated by a spindle (not shown). Rotation of the disk 16 induces a flow of air below the slider 14. The recording hear 14 has aerodynamic features which induce the formation of the air bearing 12 between the slider 14 and the rotating disk 16.

The flying height tester 10 further includes a light source 18 which directs a beam of light 20 through the disk 16. The light beam 22h is reflected off the slider 14 and back through the disk 16. Part of the beam 22s also reflects off the interface between the disk 16 and the air bearing 12. The two reflected light beams 22h and 22s create an interference pattern that is detected by a photodetector 24. The photodetector 24 is coupled to a computer 26 that can determine the height of the air bearing 12 from the interference pattern.

Figure 10:
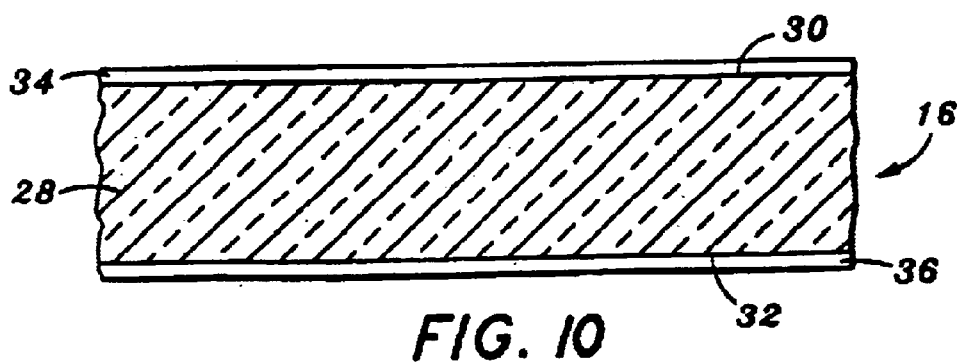
FIG. 10 illustrates one embodiment of a cross section of the disk used in a flying height tester.

FIG. 10 illustrates one embodiment of a cross section of the disk 16. The disk 16 has a substrate 28, which has a first surface 30 and an opposite second surface 32. The substrate 28 is typically constructed from a glass material such as BK-7 that is transparent to light. Other optical quality materials may also be used such as quartz, fused silicon or sapphire.

In accordance with the principles of the invention, the first surface 30 of the disk 16 may be covered with a coating 34. In general, the thickness of the coating 34 or 36 should be greater than $\lambda/(4n_c)$, where $\lambda$ is the wavelength of light and $n_c$ is the refractive index of the coating. In one embodiment, the thickness of the coating is 80 nm for $n_c$ of 2.39 and $\lambda$ of 450 nm.

The coating 34 or 36 may be a hydrogenated or nitrogenated DLC material or any combination thereof. In addition to providing a hard protective surface, the coating 34 or 36 may also provide other favorable tribological properties such as lower stiction, lower friction and corrosion resistance. Additionally, the nitrogen content of nitrogenated DLC may be varied to reduce the amount of tribo-charging and resulting accumulation of debris and contamination on the surface of the disk 16. Reduced tribo-charging will play an important role in testing MR heads. Furthermore, the DLC will also improve the adsorption of a lubricant that may also be applied to the disk 16.

In one embodiment, the coating 36 is identical to the coating 34. The identical coating 36 may be coated on the second surface 32 of the glass disk substrate 28 to facilitate the ease of use of the disk for the operator. One reason is that the coating can be transparent and visually it can be difficult to tell which side has the coating if only one side is coated. In addition, with coating 34 and/or 36 on both sides (surfaces 30 and 32 respectively), operators can easily flip the disk in case one surface is damaged instead of throwing away the disk.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A flying height tester for a recording head of a hard disk drive, comprising:
   a transparent substrate that has a first surface and an opposite second surface;
   a coating on said first surface of said transparent substrate, said coating being adjacent to the recording head, wherein a thickness of said coating is substantially inversely proportional to a refractive index of said coating;
   a light source that directs a beam of light through said transparent substrate and said coating and onto the recording head, wherein the beam of light is reflected from the recording head; and,
   a photodetector that detects the reflected light beam;
   a computer that is coupled to said photodetector and determines a flying height, said coating thickness having a value so that a minimum intensity level of the reflected light beam is at a negative flying height.

2. The tester as recited in claim 1, wherein said thickness of said coating is further substantially proportional to a wavelength of said light.

3. The tester as recited in claim 1, wherein said coating is transparent.

4. The tester as recited in claim 3, wherein said transparent coating has a hardness that is greater than a hardness of said transparent substrate.

5. The tester as recited in claim 3, wherein said transparent substrate is a glass material and said transparent coating is a diamond-like-carbon material.

6. The tester as recited in claim 5, wherein said diamond-like-carbon material is hydrogenated.

7. The tester as recited in claim 5, wherein said diamond-like-carbon material is nitrogenated.

8. A flying height tester for a recording head of a hard disk drive, comprising:
   a transparent substrate that has a first surface and an opposite second surface;
   a coating on said first surface of said transparent substrate, said coating being adjacent to the recording head, wherein a thickness of said coating is substantially inversely proportional to a refractive index of said coating;
   a light source that directs a beam of light through said transparent substrate and said coating and onto the recording head, wherein the beam of light is reflected from the recording head; and,
   a photodetector that detects the reflected light beam;
   computer means for determining a flying height, said coating thickness having a value so that a minimum intensity level of the reflected light beam is at a negative flying height.

9. The tester as recited in claim 8, wherein said thickness of said coating is further substantially proportional to a wavelength of said light.

10. The tester as recited in claim 8, wherein said coating is transparent.

11. The tester as recited in claim 10, wherein said transparent coating has a hardness that is greater than a hardness of said transparent substrate.

12. The tester as recited in claim 10, wherein said transparent substrate is a glass material and said transparent coating is a diamond-like-carbon material.

13. The tester as recited in claim 12, wherein said diamond-like-carbon material is hydrogenated.

14. The tester as recited in claim 12, wherein said diamond-like-carbon material is nitrogenated.

15. A method for determining a fly height of a recording head of a hard disk drive, comprising:
   detecting a light beam that is transmitted through a transparent substrate and reflected from a recording head; and,
   determining a fly height of the recording head from the detected light beam, a coating of the transparent substrate having a value so that a minimum intensity level of the reflected light beam is at a negative fly height.

* * * * *